United States Patent [19]

Morisaki et al.

[11] Patent Number: 5,083,225
[45] Date of Patent: Jan. 21, 1992

[54] DIGITAL SIGNAL RECORDING AND PLAYBACK APPARATUS

[75] Inventors: Kazuhiko Morisaki; Yasuo Inoue, both of Yokohama, Japan

[73] Assignee: Victor Company of Japan, Ltd., Yokohama, Japan

[21] Appl. No.: 310,530

[22] Filed: Feb. 15, 1989

[30] Foreign Application Priority Data

Feb. 16, 1988 [JP] Japan .................. 63-33640

[51] Int. Cl.⁵ .................. G11B 15/14; G11B 5/86; G11B 21/04
[52] U.S. Cl. .................. 360/64; 360/15; 360/70
[58] Field of Search .................. 360/15, 64

[56] References Cited

U.S. PATENT DOCUMENTS

| | | | |
|---|---|---|---|
| 4,628,373 | 12/1986 | Takahashi et al. | 360/64 |
| 4,839,750 | 6/1989 | Kato et al. | 360/32 |
| 4,872,070 | 10/1989 | Cooper et al. | 360/15 |
| 4,888,653 | 12/1989 | Cullum | 360/15 |
| 4,905,104 | 2/1990 | Okamoto et al. | 360/64 |

*Primary Examiner*—Aristotelis M. Psitos
*Assistant Examiner*—Won Tae C. Kim
*Attorney, Agent, or Firm*—Fleit, Jacobson, Cohn, Price, Holman & Stern

[57] ABSTRACT

A digital signal recording and playback apparatus having a rotary heads mounted on a rotary drum capable of recording/reproducing a digital signal onto/from a magnetic tape at a tape speed which is N times as much as the standard speed while conforming to the standard track angle and length. The number of the rotary heads are increased from the standard two heads whereas the drum speed is made one half of N times standard speed and the drum diameter is made slightly larger from the standard so that the relative speed between the running tape and the rotating heads becomes equal to the standard in the double tape speed mode, and becomes twice that in the quadruple tape speed mode. Alternatively, the tape is wound around the drum having two heads, over the angular range of 180 degrees instead of the standard 90 degrees, the drum diameter is made smaller than the standard, and the drum speed is N times the standard so that the relative speed of the heads becomes equal to the standard in the double tape speed mode.

5 Claims, 12 Drawing Sheets

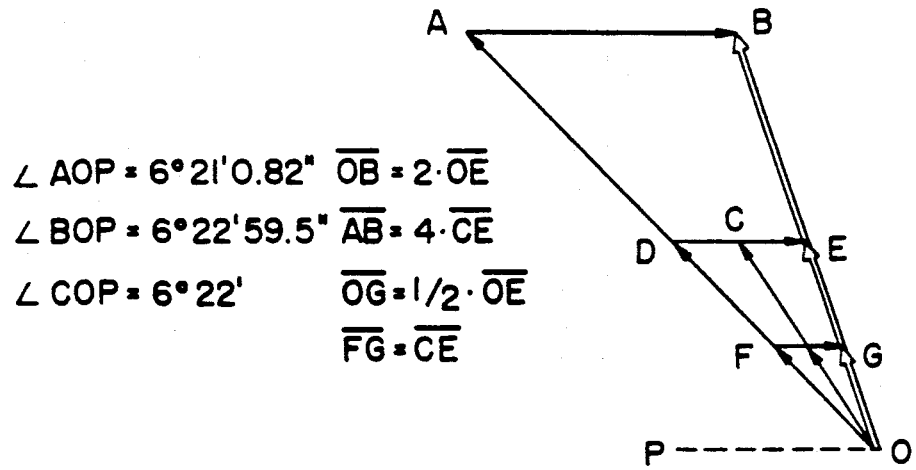

∠AOP = 6°21'0.82"  $\overline{OB} = 2 \cdot \overline{OE}$
∠BOP = 6°22'59.5"  $\overline{AB} = 4 \cdot \overline{CE}$
∠COP = 6°22'  $\overline{OG} = 1/2 \cdot \overline{OE}$
  $\overline{FG} = \overline{CE}$

FIG. 4A

| MODE | VECTOR | HEAD TANGENTIAL VELOCITY | TAPE RUNNING VELOCITY | RELATIVE VELOCITY |
|---|---|---|---|---|
| CONVENTIONAL STANDARD MODE | | $\overrightarrow{OC}$ | $\overrightarrow{CE}$ | $\overrightarrow{OE}$ |
| TAPE SPEED IN THIS INVENTION | QUADRUPLE SPEED | $\overrightarrow{OA}$ | $\overrightarrow{AB}$ | $\overrightarrow{OB}$ |
| | DOUBLE SPEED | $\overrightarrow{OD}$ | $\overrightarrow{DE}$ | $\overrightarrow{OE}$ |
| | STANDARD SPEED | $\overrightarrow{OF}$ | $\overrightarrow{FG}$ | $\overrightarrow{OG}$ |

FIG. 4B

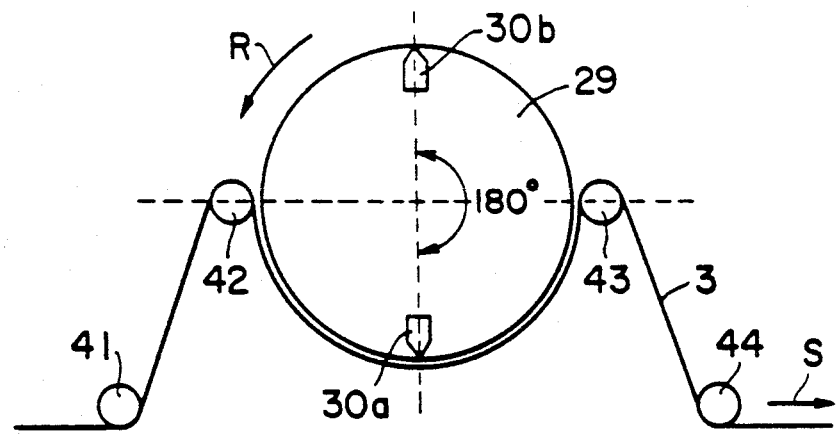

FIG. 14

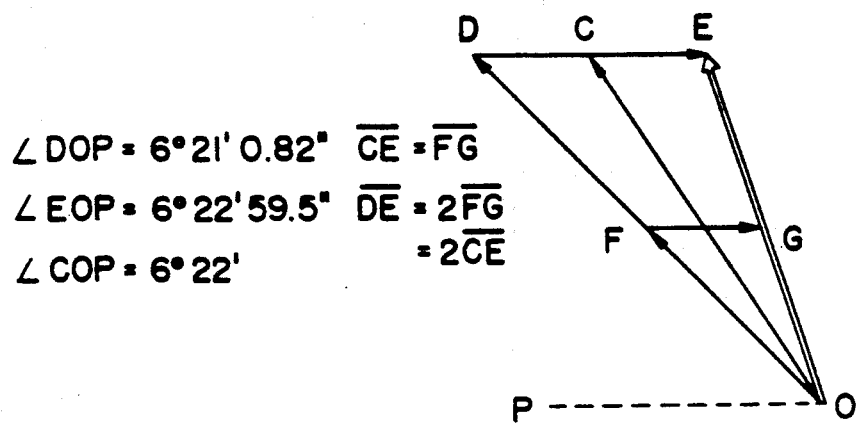

∠DOP = 6°21'0.82"   $\overline{CE} = \overline{FG}$
∠EOP = 6°22'59.5"   $\overline{DE} = 2\overline{FG}$
∠COP = 6°22'        $= 2\overline{CE}$

FIG. 15A

| MODE | VECTOR | HEAD TANGENTIAL VELOCITY | TAPE RUNNING VELOCITY | RELATIVE VELOCITY |
|---|---|---|---|---|
| CONVENTIONAL STANDARD MODE | | $\overrightarrow{OC}$ | $\overrightarrow{CE}$ | $\overrightarrow{OE}$ |
| TAPE SPEED IN THIS INVENTION | DOUBLE SPEED | $\overrightarrow{OD}$ | $\overrightarrow{DE}$ | $\overrightarrow{OE}$ |
| | STANDERD SPEED | $\overrightarrow{OF}$ | $\overrightarrow{FG}$ | $\overrightarrow{OG}$ |

FIG. 15B

DIGITAL SIGNAL RECORDING AND PLAYBACK APPARATUS

BACKGROUND OF THE INVENTION

This invention relates to a digital signal recording and playback apparatus, and more particularly to a digital signal recording and playback apparatus capable of satisfactorily recording or playback of a digital signal even in the case of running a magnetic tape at high speed.

For the rotary drum of a Digital Audio Tape recorder (DAT) which is an apparatus for recording and playback of a digital audio signal using a magnetic head, there is known a rotary drum in the system around which a magnetic tape (hereinafter simply referred to as a "tape") 3 is wound in an angular range of 90 degrees of a rotary drum 2 on which two rotary heads 1a and 1b having different azimuth angles are provided at an angular interval of 180 degrees as shown in FIGS. 1A and 1B.

In these figures, reference numerals 41 to 44 denote guide rods for guiding the tape 3 for the purpose of allowing the tape 3 to be in contact with the rotary drum 2, respectively.

There is an established Industry Standard for the DAT (which may be referred to as simply "the DAT format" in this specification) which specifies or recommends specifications of tape format and of related mechanical components and their performances. According to the, standard, track length L of 2.3501 cm, a track angle $\theta$ of 6 degrees 22 minutes 59.5 seconds, and a tape transport speed of 0.815 cm/sec are standardized, and a drum diameter of 30 mm and drum rotational speed of 2,000 revolutions per minute (r.p.m.) are recommended for one of the various operating modes. And a lead angle of 6 degrees 22 minutes, which will be explained later, is recommended also.

For a convenience of explanation of this invention, all of those standardized or recommended figures in the DAT format are referred to as "standard" values in this specification, further, recording and reproducing operation under those "standard" values is referred to as "standard" mode unless otherwise specified.

The above-mentioned rotary drum 2 has the standard diameter of 30 mm and rotates at the standard rotational speed of 2000 revolutions per minute (hereinafter referred to as 2000 r.p.m), and the tape 3 is transported at the standard speed of 0.815·cm/sec. Furthermore, the lead or introduction angle when the tape 3 is wound onto the rotary drum 3 is the standard lead angle 6 degrees 22 minutes (hereinafter referred to as 6°', etc.). The lead angle is the inclination of the rotary axis of the rotary drum with respect to the perpendicularly transversed direction of the magnetic tape obliquely wrapped around the rotary drum. The relationship between the rotational direction R of the rotary drum 2 and the running direction S of the magnetic tape 3 is actually determined as shown in FIG. 1. As a result, at the time of recording, the digital signal is recorded while forming tracks as a head scanning locus 4a and 4b on the tape 3 as shown in FIG. 2, and a track angle $\theta$ defined by these tracks and the running direction S of the tape 3 is equal to 6°22'59.5" standardized in the DAT format.

On the other hand, at the time of playback, the magnetic heads 1a and 1b provided and being angularly spaced to each other by an angle of 180 degrees alternately scan these tracks 4a and 4b consecutively formed without a guard band therebetween, whereby the recorded digital signal is read out. At this time, the time required until the magnetic head 1a or 1b rotates by an angle of 90 degrees to scan one track is 7.5 milliseconds (msec).

In such an arrangement where the tape 3 is wound in an angular range of 90 degrees onto the rotary drum 2 on which the magnetic heads 1a and 1b are provided at an interval of 180 degrees, there is a 7.5 msec blank period during which the tape is not contacted nor scanned by either magnetic head 1a or 1b, between the end of one track scan by one head and the beginning of the subsequent track scan by another head. Accordingly, in order to adapt the continuous recording or playback digital signal to such an intermittent operation which is carried out only when the magnetic head is scanning the track, time compression processing is implemented to the digital signal.

In general, the time required for dubbing a digital audio signal from one DAT to another DAT having a rotary drum constituted as shown in FIG. 1 is equal to the time required for reproducing the signal on the tape at the standard speed. For example, in the case of dubbing a two hour length of digital program, it takes two hours which is the same as that at the time of playback for normal listening. On the other hand, most tape recorders of analog system so-called "doubledeck machines" have a function capable of carrying out dubbing at double speed or a speed higher than a standard one. Under these circumstances, a high speed dubbing function is desired also for DATs.

Furthermore, in the case of using DAT for backing up a hard disk, etc. for use in a computer system as a data streamer, or in other similar cases, there is a need for carrying out recording/playback of data at a high speed. The transfer speed in this case is restricted by the basic electrical and mechanical characteristics of the DAT.

If an attempt was made to carry out a dubbing, e.g., at a quadruple tape speed, i.e. 4 times the standard tape speed, using the apparatus of FIG. 1, it would require to rotate the rotary drum at 8000 r.p.m. which is four times faster than the standard speed. However, since the relative speed between the magnetic head 1a or 1b scanning the tracks 4a and 4b on the tape 3 and the tape 3 would also become equal to a value four times as large, the recording/playback frequencies become extremely high. As a result, the signal level would be lowered by the inherent characteristics of the magnetic head 1a or 1b and the rotary transformer (not shown) provided within the rotary drum 2 to conduct transmission and reception of signals, resulting in the problem that it would be unable to carry out recording and playback in full fidelity. Furthermore, at this time, the modulator circuit and the demodulator circuit, etc. must perform circuit operation at four times the speed.

In addition, there would be a problem of revolving the rotary drum 2 at 8000 r.p.m. which is a value four times larger than the standard value. There would likely develop unstable tape running in the tape transport system.

SUMMARY OF THE INVENTION

This invention has been made in view of the above circumstances and its object is to provide a digital signal recording and playback apparatus capable of maintaining stable circuit operation of the modulator/demodulator circuits as well as the operation of the tape running system, and of carrying out recording and playback of digital signals at high speed in full fidelity.

To achieve the above object, when the running speed of the magnetic tape is selected to a value N times (N≧1, e.g., two times or four times) as much as the standard speed (0.815 cm/sec) and the number of revolutions of the rotary drum is selected to a value M times (M<N, e.g., one time or two times) as large as the standard speed, in order to allow the relative speed between the magnetic heads and the magnetic tape to be equal to a value M times as large as the standard relative speed for the DAT, and to enable recording of a digital signal in conformance to the DAT format and/or playback of the digital signal recorded on the magnetic tape in conformance to the standard head scanning locus rotated in the DAT format, the diameter of the rotary drum is modified to a value (e.g., 30.077 mm) slightly larger than the standard diameter (30 mm), and the lead angle is modified to a value (e.g., 6°21'0.82") slightly smaller than the standard one (6°22').

Furthermore, when the running speed of the magnetic tape is modified to a value N times (N≧1, e.g., two times) the standard speed, and the number of revolutions of the rotary drum is also modified to a value N times as large as that, in order to allow the relative speed of the magnetic heads and tape to be equal to the afore-mentioned standard relative speed, and to enable recording of a digital signal in conformance to the DAT format and/or playback of the digital signal recorded on the magnetic tape in conformance to the standard head scanning locus, the diameter of the rotary drum is modified to a value (e.g., 15.039 mm) smaller than the standard one and the lead angle is modified to a value (e.g., 6°21'0.82") smaller than the standard lead angle.

There are other possibilities of arrangement employed wherein the diameter of the rotary drum is, e.g., 30.077 mm, four magnetic heads are provided instead of two, the lead angle is selected to, e.g., 6°21'0.82", and the magnetic tape is wound in an angular range of 90 degrees, it is possible to allow the rotational speed of the rotary drum to be 1000 r.p.m. for the standard tape running speed, or to allow the rotational speed of the rotary drum to be 2000 r.p.m. for the double (two times standard speed) tape running speed, or to allow the rotational speed of the rotary drum to be 4000 r.p.m. for the quadruple tape running speed. Thus, even in the case of carrying out recording or playback up to quadruple tape running speed, the recording and playback apparatus can record or playback a digital signal, e.g., a digital audio signal, etc. with the characteristic and the operating performance designed for the double tape running speed.

Furthermore, when there is employed a construction wherein the diameter of the rotary drum is modified to, e.g., 15.039 mm, two magnetic heads are provided, the magnetic tape is wound in an angular range of 180 degrees, and the lead angle is modified to, e.g., 6°21'0.82", it is possible to allow the rotational speed of the rotary drum to be 2000 r.p.m. for the standard tape running speed, and to allow the rotational speed of the rotary drum to be 4000 r.p.m. for the double speed tape running. Thus, even in the case of carrying out recording or playback at the double tape running speed, the recording and playback apparatus can record or playback a digital signal, e.g., a digital audio signal, etc. with the same characteristics and operating performance designed for those of the conventional DATS.

BRIEF DESCRIPTION OF THE DRAWINGS

In the accompanying drawings:

FIG. 4A is a vector diagram showing the running velocity of the magnetic tape, tangential velocity of the magnetic head, and a relative velocity between both these velocities, and FIG. 4B is a table in which vectors of respective velocities in FIG. 4A are comprehensibly arranged in order;

FIG. 14 is a plan view showing a rotary drum according to a second embodiment of this invention;

FIG. 15A is a vector diagram showing the running velocity of the magnetic tape, the tangential velocity of the magnetic head, and the relative velocity between both these velocities, and FIG. 15B is a table in which vectors of respective velocities of FIG. 15A are comprehensibly arranged in order;

DESCRIPTION OF THE PREFERRED EMBODIMENTS

Preferred embodiments of a digital signal recording and playback apparatus according to this invention will be described in detail with reference to the attached drawings.

Figure 1A:
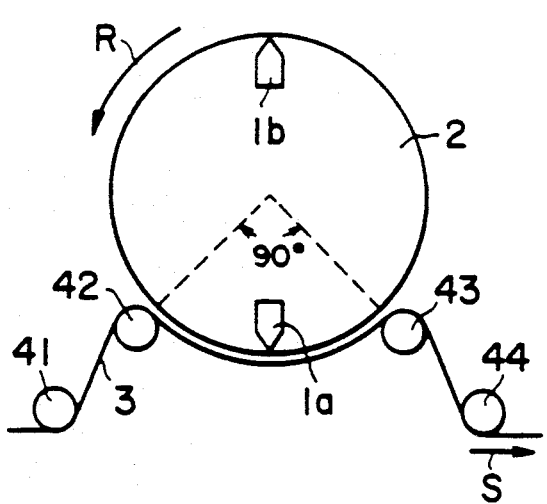
FIGS. 1A and 1B are a plan view and a perspective view showing a rotary drum of DAT as an example of a conventional signal recording and playback apparatus, respectively.
Figure 1B:
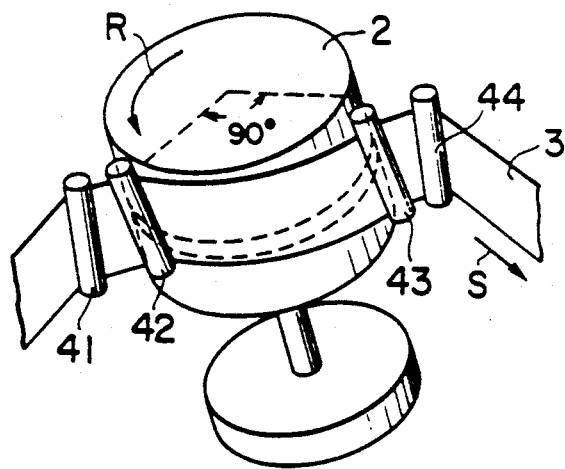
Figure 3:
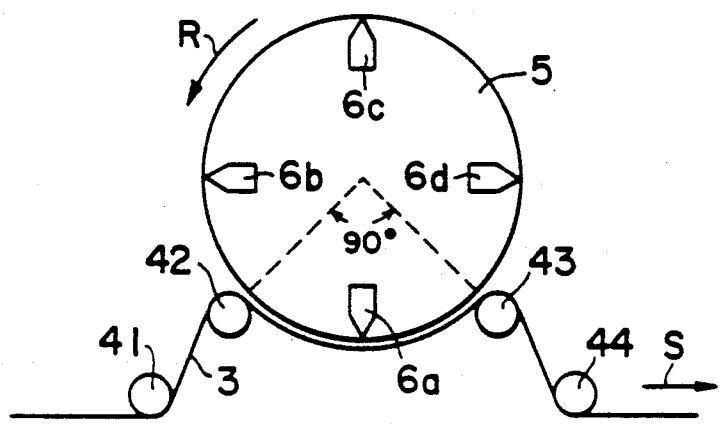
FIG. 3 is a plan view showing a rotary drum as the essential part of a digital signal recording and playback apparatus according to a first embodiment of this invention.

FIG. 3 shows a rotary drum 5 and its peripheral arrangement in a first embodiment of this invention. The rotary drum 5 is provided coaxially with a stationary drum (not shown) as usual. The diameter of the rotary drum 5 shown in this figure is 30.077 mm, while the diameter of the standard rotary drum 2 shown in FIG. 1 is 30 mm. The rotary drum 5 has four magnetic heads 6a, 6b, 6c and 6d (6a and 6c are plus azimuth heads, and 6b and 6d are minus azimuth heads, respectively.). In addition, tape 3 is obliquely wound onto the rotary drum 5 at a lead angle of 6°21′0.82″. This is also different from the standard value of 6°22′ for the conventional apparatus. In FIG. 3, reference numerals 41 to 44 denote guide rods similarly to the conventional ones, respectively.

FIG. 4A is a vector diagram showing the running velocity of the tape, the tangential velocities of magnetic heads 6a to 6d, and the relative velocities between the magnetic heads 6a to 6d and the tape 3 when the apparatus constructed in accordance with the above-mentioned specifications is operated (It is to be noted that angles between respective vectors are exaggerated thus different from actual ones for facilitating the understanding of the explanation). In FIG. 4B, vectors in FIG. 4A respectively corresponding to the tangential velocities of the magnetic heads 6a to 6d, the running velocity of the tape, and the relative velocities therebetween when the apparatus operates in the respective modes are shown as a table.

In FIG. 4A, the broken line OP represents the direction of tape running, vector $\overrightarrow{OC}$ represents a tangential velocity (rotational speed is 2000 r.p.m.) in the standard mode, where the magnetic tape runs at the standard speed of the magnetic heads 1a and 1b in the conventional apparatus shown in FIG. 1, and vector $\overrightarrow{CE}$ represents a running velocity of the tape 3 in the standard mode in the same apparatus. At this time, a resultant vector $\overrightarrow{OE}$ from the vector $\overrightarrow{OC}$ and the vector $\overrightarrow{CE}$ represents a relative velocity between the magnetic head 1a or 1b and the tape 3. And an angle (∠EOP) defined by the vector $\overrightarrow{OE}$ and the tape running direction OP the standard track angle θ of 6°22′59.5″ which must be observed all the time as well as the standard track length L. Accordingly, an angle (∠COP) defined by the vector OC and the vector OP corresponds to a lead angle of the tape 3 in FIG. 1. This angle becomes equal to 6°22′ as previously described as the standard lead angle.

The vector $\overrightarrow{OF}$ represents a tangential velocity of the magnetic head 6a, etc. in the case of carrying out recording/playback at the standard tape speed using the apparatus of FIG. 3 which is modified from the conventional apparatus, and the revolutional speed of the rotary drum 5 in this case is modified to 1000 r.p.m., wherein ∠FOP represents a lead angle of the tape 3 in FIG. 3, which becomes equal to 6°21′0.82″ as described before. Since the running velocity $\overrightarrow{FG}$ of the tape 3 in this case is equal to the standard one ($\overrightarrow{CE}=\overrightarrow{FG}$), relative velocity between the magnetic head 6a, etc. and the tape 3, which is represented by vector $\overrightarrow{OG}$, is directed in the same direction as that of the vector $\overrightarrow{OE}$, and its magnitude becomes equal to one half thereof but the standard track angle θ which is equal to the angle ∠EOP and the standard track length L are still observed. On the other hand, the time required until, e.g., the magnetic head 6a rotates in R-direction by an angle of 90 degrees to scan one track on the tape 3 becomes equal to 15 msec, which is two times as much as the conventional one.

Figure 2:
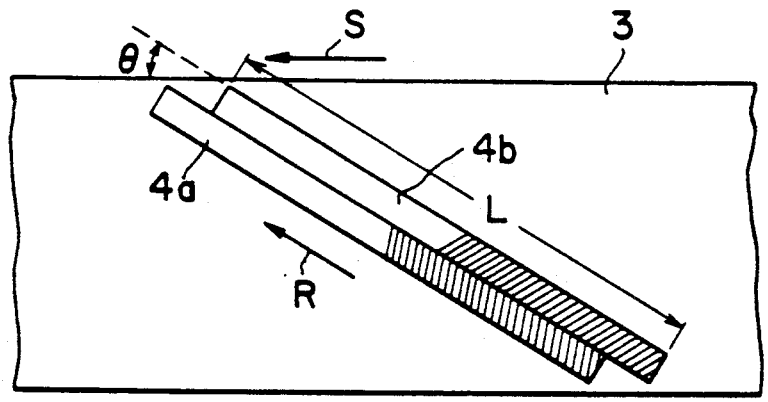
FIG. 2 is a plan view showing the standard track configuration with respect to a digital signal recording tape according to the Industry Standard for DAT.

In FIG. 3, when it is assumed that, the magnetic head 6a rotates by an angle of 90 degrees to effect a scanning on the tape 3 at a time period of 15 msec at the time of recording to form one track to conduct a recording, the magnetic head 6b will begin scanning on the tape at the time when the scanning of the magnetic head 6a is completed to form a next track to conduct a recording. At times subsequent thereto, when digital signals are recorded for a time period during which scanning on the tape 3 is sequentially conducted in the same manner as stated before, tracks similar to those in FIG. 2 are formed on the tape 3. Namely, the recording tape 3 based on the DAT format is obtained.

At the time of playback, by using the magnetic heads 6a to 6d as the playback heads to sequentially conduct a scanning of respective tracks on the tape 3 in a manner similar to the above, it is possible to read the digital signals recorded thereon.

As just described above, the apparatus of the first embodiment has an arrangement such that four magnetic heads 6a to 6d are provided, and that the rotary drum 5 is rotated at 1000 r.p.m. during recording/playback, thus allowing any one of magnetic heads 6a to 6d to stay on the tape 3 for scanning at all times. Thus, the blank time between scanning operations encountered with the conventional apparatus does not occur. In relation to this, since it is possible to allow the time required for scanning one track by four magnetic heads 6a to 6d to be a value two times as much as the conventional one, recording/playback can be advantageously conducted with the data bit rate therefor being one half.

An actual example for carrying out times four high-speed dubbing using the apparatus of FIG. 3 will now be described. The recording operation and the playback operation will be similarly explained. In FIG. 4A, vector $\overrightarrow{AB}$ represents a running velocity of the tape 3 at the time of times four speed dubbing, and is parallel to the vector $\overrightarrow{CE}$ and has a magnitude four times larger than the standard speed. The rotary drum 5 is rotated at 4000 r.p.m., and the tangential velocity of the magnetic heads 6a to 6d at that time is represented by vector $\overrightarrow{OA}$. Thus, the relative velocity between the magnetic heads 6a to 6d and the tape 3 is represented by $\overrightarrow{OB}$, and has a magnitude four times that of the vector $\overrightarrow{OG}$ in the standard mode of this embodiment. When compared with the relative velocity $\overrightarrow{OE}$ in the standard mode of the conventional apparatus, it has a magnitude two times as much as that, and an angle ∠BOP agrees to the angle ∠EOP thus the standard track angle θ and the standard track length L are observed.

Figure 5:
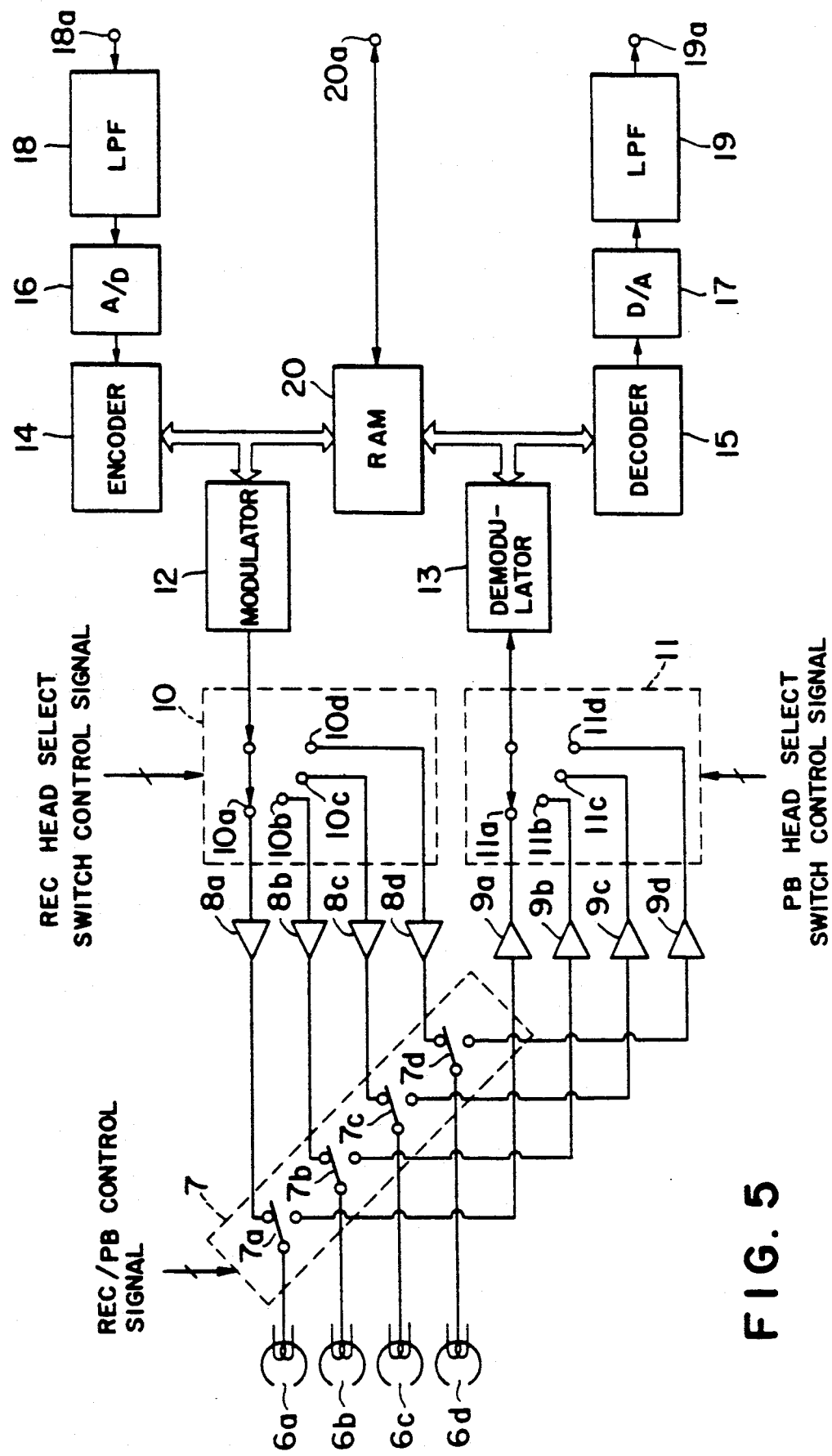
FIG. 5 is a block diagram showing the schematic circuit configuration of the Digital Audio Tape recorder (DAT) using the rotary drum shown in FIG. 3.

FIG. 5 is a block diagram showing a recording/playback circuit when the rotary drum 5, etc. of FIG. 3 is used. This circuit includes changeover switches 7a to 7d for connecting magnetic heads 6a to 6d to the recording unit or the playback unit, which effect switching operation in response to a recording/playback control signal, recording amplifiers 8a to 8d, and playback amplifiers 9a to 9d. The recording/playback circuit further includes a select switch 10 for selection of the magnetic heads 6a to 6d at the time of recording, which effects switching operation in response to a recording head select switch control signal, and a select switch 11 for selection of the magnetic heads 6a to 6d at the time of playback, which effects switching operation in response to a playback head select switch control signal.

In FIG. 5, the recording/playback circuit further includes, as the components on the recording side, a lowpass filter 18 for passing only the low frequency components of an input analog recording signal supplied to a terminal 18a, an analog/digital (A/D) converter 16 for converting an analog signal which is an output from the filter 18 to a digital signal, an encoder 14 for encoding into a desired code format the digitalized recording signal from the A/D converter 16, and a modulator 12 for modulating the coded recording signal to output it to the select switch 10. In addition, the recording/playback circuit includes, as the components on the playback side, a demodulator 13 for demodulating a signal to be reproduced from the select switch 11, a decoder 15 for decoding an output from the demodulator 13, a digital/analog (D/A) converter 17 for converting a digital signal which is a reproduced signal from the decoder 15 to an analog signal, and a low-pass filter 19 for passing only the low frequency components of the analog reproduced signal from the D/A converter 17 to a terminal 19a. Respective digitalized signal data of signals to be recorded and then reproduced are written into a RAM 20 connected to the encoder 24 and the decoder 15 before modulation and after demodulation, respectively.

Figure 6:
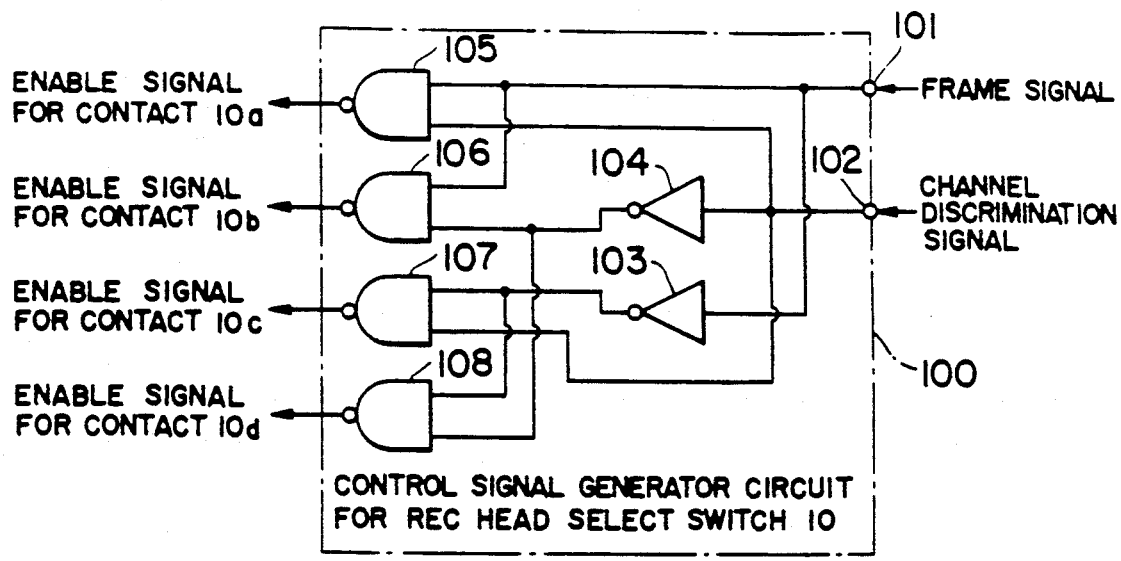
FIG. 6 is a block diagram showing a control signal generator circuit for controlling the recording head changeover switch 10 shown in FIG. 5.
Figure 7:
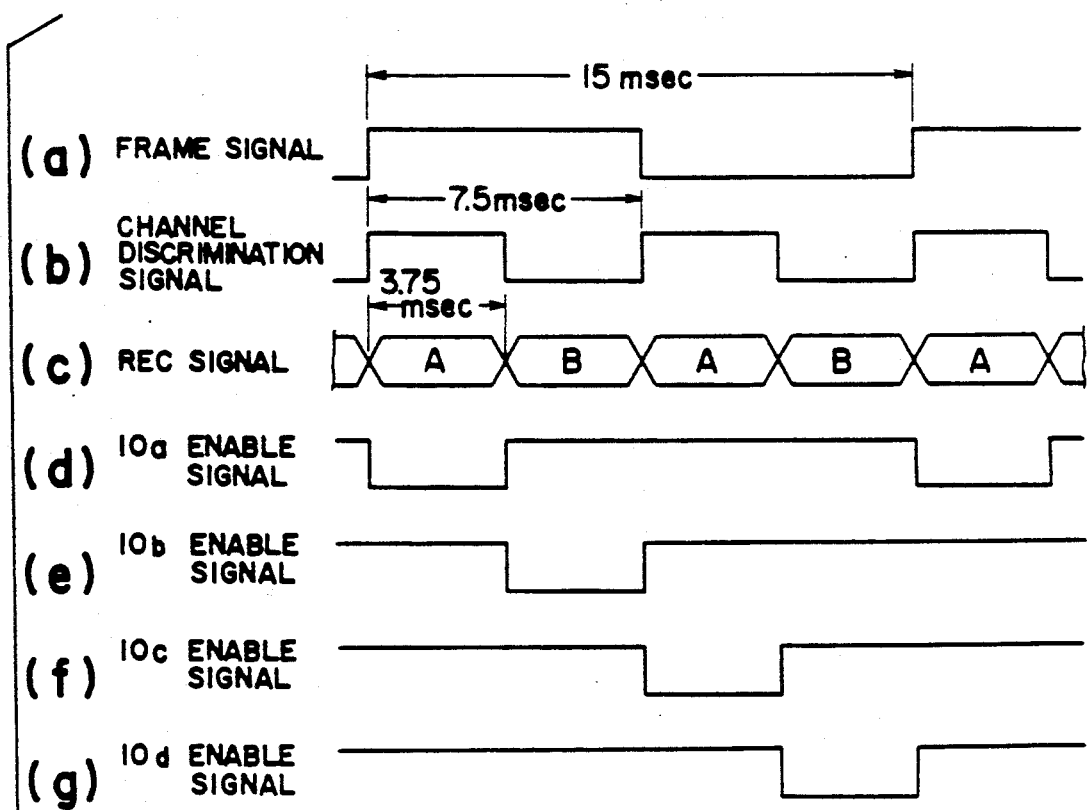
FIG. 7(a-g) is a timing chart showing timings of control signals used for controlling the recording head.

The above-mentioned select switch 10 is controlled by the recording head select switch control signal. FIG. 6 is a logic circuit diagram showing an example of the control signal generator circuit for operating the select switch 10 in FIG. 5. In FIG. 6, a recording head select switch control signal generator circuit 100 comprises a frame signal input terminal 101, a channel discrimination signal input terminal 102, first and second NOT circuits 103 and 104 for inverting signals inputted from the terminals 101 and 102, respectively, a first NAND circuit 105 for providing an inversed negated logical product of both the signals input through the terminals 101 and 102, a second NAND circuit 106 for providing an inversed logical product of the frame signal inputted from the terminal 101 and an output from the second NOT circuit 104, a third NAND circuit 107 for providing an inversed logical product of an output from the first NOT circuit 103 and the discrimination signal inputted from the terminal 102, and a fourth NAND circuit 108 for providing an inversed logical product of both outputs from the NOT circuits 103 and 104. In the recording mode, the respective outputs from the first to fourth NAND circuits 105 to 108 allow changeover contacts 10a to 10d of the select switch 10 and its movable contact to be closed, thus placing the heads 6a to 6d in a recordable state. The operation of the logic circuit shown in FIG. 6 is performed on the basis of a frame signal having a period of 5 msec shown in FIG. 7(a) which is inputted to the terminal 101, a channel discrimination signal having a period of 7.5 msec shown in FIG. 7(b) which is inputted to the terminal 102, causing a recording signal shown in FIG. 7(c) supplied from the modulator 12 so as to be supplied sequentially to the heads 6a to 6d to form alternately the tracks of A and B channels depending on the above-mentioned discrimination signal. The frame signal and the discrimination signal are genestandard in the encoder 14. By inputting these two signals having different periods to the generator circuit 100, respective logic elements 105 to 108 perform predetermined logical operations to generate respective enable signals shown in FIGS. 7(d) to 7(g). For example, when the frame signal and the channel discrimination signal are both High level, only the enable signal of the switch contact 10a shifts to Low level. Thus, as shown in FIG. 5, the digitalized recording signal supplied from the modulator 12 is delivered to the head 6a through the recording amplifier 8a.

During the recording operation explained above, all of the changeover switches 7a to 7d are kept at the recording positions to connect the heads 6a to 6d to the respective recording amplifiers 8a to 8d. As explained in the foregoing, the select switch 10 is sequentially switched by the recording head select switch control signal at timings such that the contact 10a is selected when recording is conducted using the magnetic head 6a, and that the contact 10b is selected when recording is conducted using the magnetic head 6b.

Figure 8:
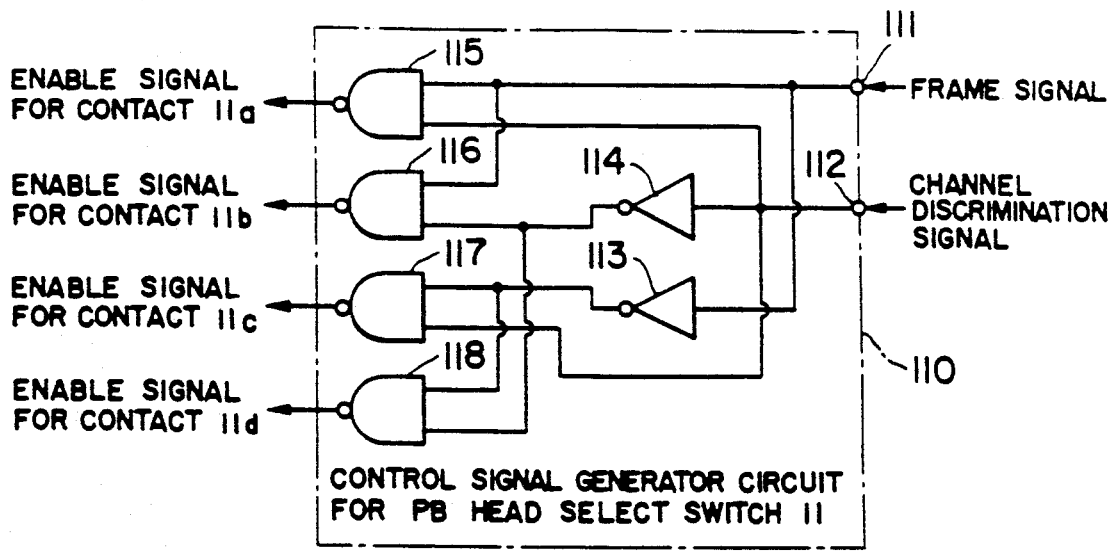
FIG. 8 is a block diagram showing a control signal generator circuit for controlling the playback head changeover switch 11 shown in FIG. 5.
Figure 9:
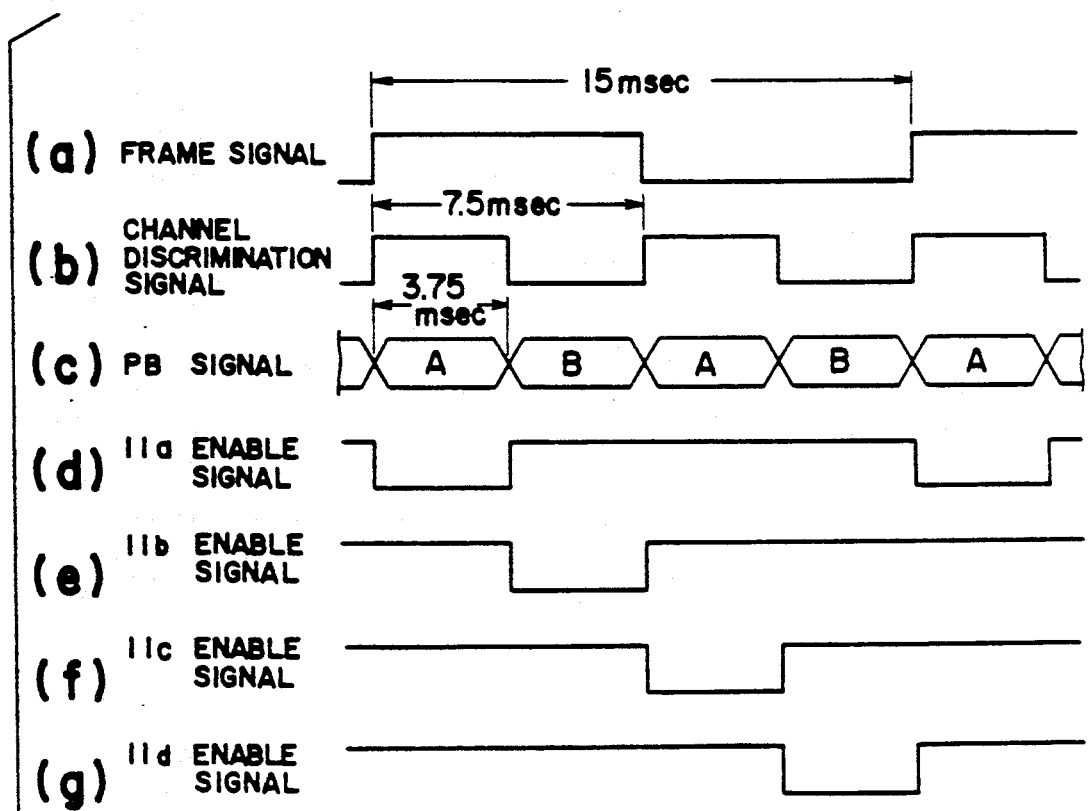
FIG. 9 (a-g) is a timing chart showing timings of control signals used for controlling the playback head.

FIG. 8 is a circuit diagram showing a logic circuit configuration of a control signal generator circuit 110 for controlling the select switch 11 in FIG. 5 for sequentially switching the magnetic heads 6a to 6d in the playback operation. FIG. 9 is a timing chart showing its logical operation. In FIG. 8, the signal generator circuit 110 has an arrangement corresponding to the signal generator circuit 100 shown in FIG. 6, i.e., includes a frame signal input terminal 111, a channel discrimination signal input terminal 112, first and second NOT circuits 113 and 114, and first to fourth NAND circuits 115 to 118. The fixed contacts 11a to 11d of the switch 11 are closed by outputs from these NAND circuits 115 to 118, respectively. Thus, the playback operation of the magnetic heads 6a to 6d is carried out as shown in FIG. 9 in the similar but reversed manner explained with FIG. 7 for recording.

A dubbing operation at the quadruple tape speed using a pair of identical apparatuses shown in FIG. 5 wherein one of them is operated as a playback apparatus and another is operated as a recording apparatus and their tape speed and drum rotational speed are same each other, will be explained as follows. According to the DAT format tracks are composed of a digital signal recorded on the track 4a (see FIG. 2) having a plus azimuth (which will be called "A channel"), and a digital signal recorded on the subsequentially formed track 4b having a minus azimuth adjacent to the track 4a (which will be called "B channel"), and signal processing is carried out with one frame being as a unit.

At the time of playback, for a time period during which the rotary drum 5 makes one turn, data corresponding to 2 frames are reproduced, e.g., in order of "A channel, B channel, A channel, and B channel" by the magnetic heads 6a to 6d. At this time, all of the changeover switches 7a to 7d are maintained at the playback positions to connect the heads 6a to 6d to the respective playback amplifier 9a to 9d. The select switch 11 is switched in a manner so that it is connected to the contact 11a when playback by the magnetic head 6a is conducted, and is connected to the contact 11b when playback by the magnetic head 6b is conducted. This switching is carried out by the playback head select switch control signal, one complete cycle of the switching takes 15 msec which is four times the 3.75 msec required for playback of one channel.

Accordingly, the picked up data by the magnetic heads 6a to 6d are respectively amplified by the corresponding playback amplifiers 9a to 9d, and are converted into a continuous stream of data by the select switch 11, and are demodulated by the succeeding demodulator 13. The demodulated data are stored in the RAM 20 for being decoded and error corrected subsequently by the decoder 15, then read out from the RAM 20 to be transferred to the RAM 20 of the recording apparatus of the pair through the terminal 20a.

Figure 10:
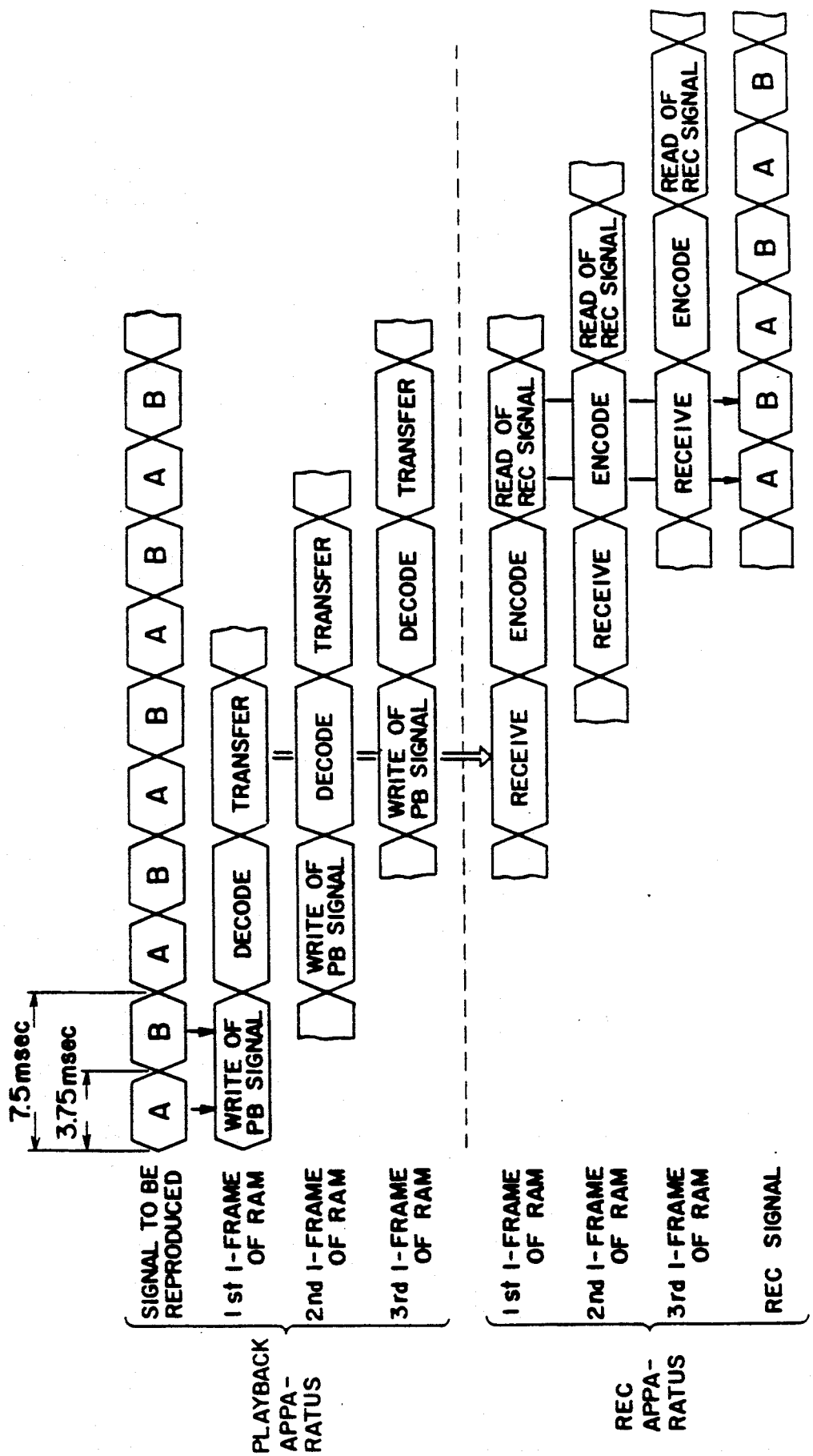
FIG. 10 is a timing chart showing dubbing operations in the case of carrying out a dubbing using two DATs shown in FIG. 5.

FIG. 10 shows a dubbing timing in the case of carrying out a dubbing using the pair of identical apparatus of FIG. 5. In the playback apparatus, a digital signal is first reproduced from a prerecorded tape 3 loaded thereto, and is written to the RAM 20 thereof at a rate of one frame being as a unit. Then, this digital signal is decoded by the decoder 15 at a rate of one frame being as a unit in a manner similar to the above, and is further transferred to the RAM 20 of the recording apparatus at the same frame rate. In the recording apparatus, the digital data of the digital signal thus transferred are received at the same frame rate, and are then encoded by the encoder 14. Furthermore, the encoded digital data of one frame are recorded onto a blank tape 3 loaded into the recording apparatus. Thus, dubbing of one cycle is completed. As can be seen from FIG. 10, it takes five frames of time from reading out the recorded data of one frame to rewriting the same one the blank tape to complete the cycle. For this reason, RAMs corresponding to three frames of data are needed on each of the recording and playback apparatus, i.e. a total of 6 frames of RAMs (Of course, a single RAM with divided memory areas may be used).

Figure 11:
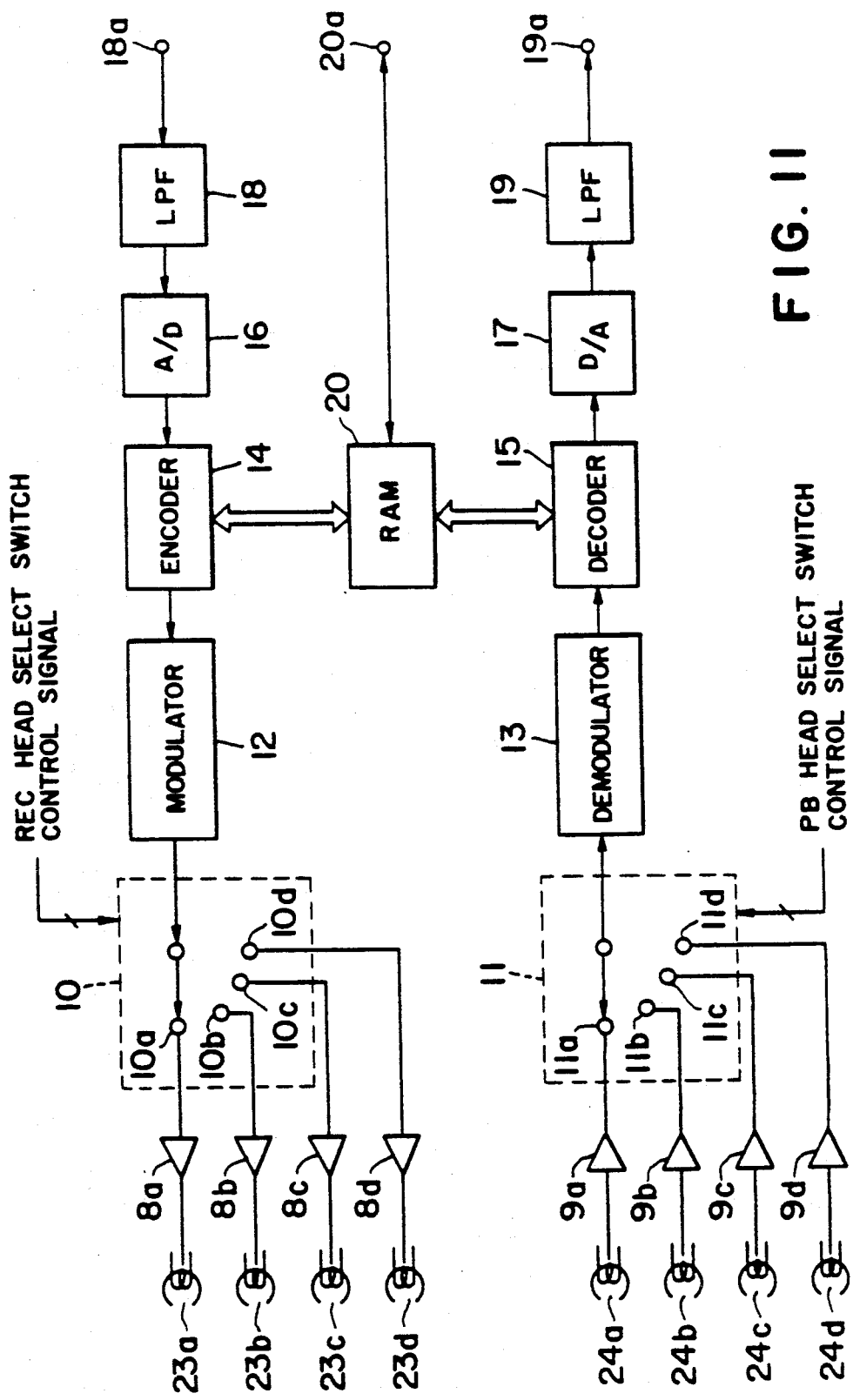
FIG. 11 is a block diagram showing a DAT using the rotary drum shown in FIG. 3 and constructed as the double deck type DAT having heads exclusively used for recording and heads exclusively used for playback.
Figure 12:
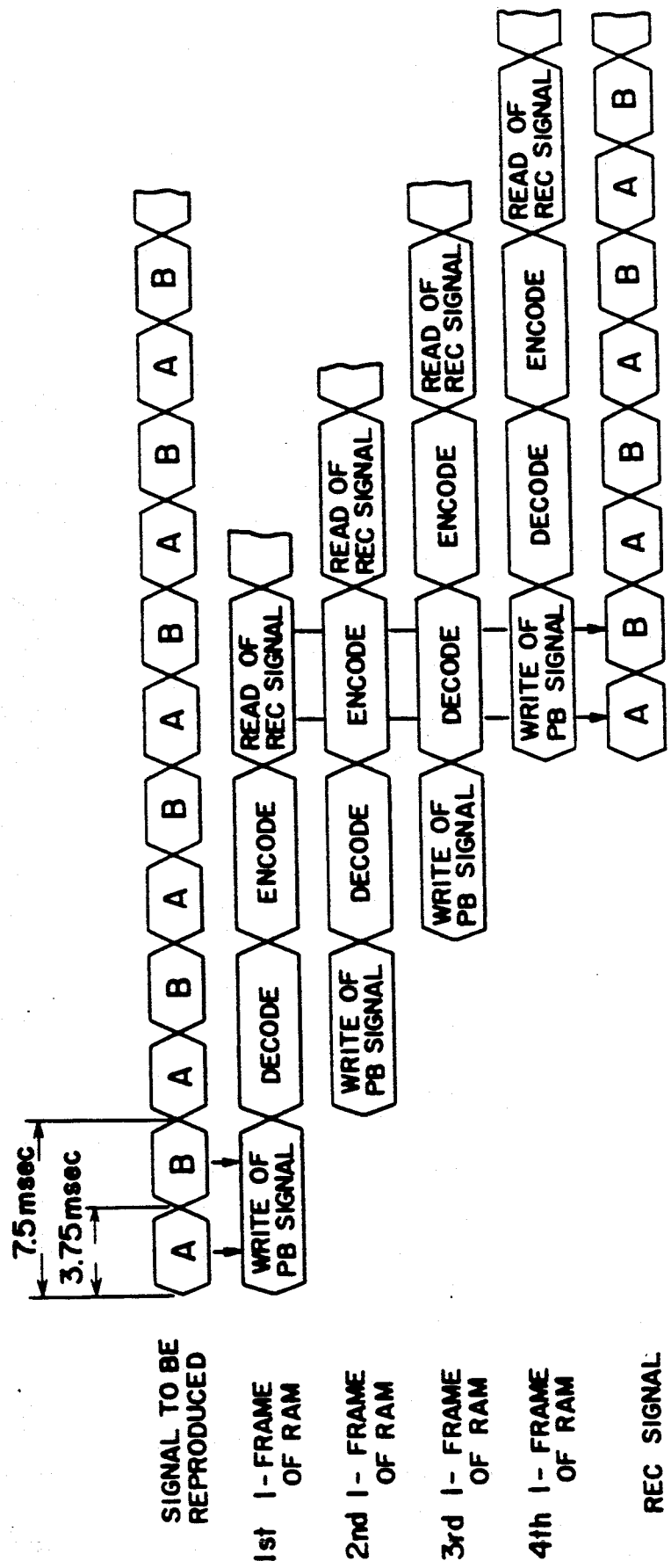
FIG. 12 is a timing chart showing the operation of the DAT of FIG. 11.

The example of dubbing operation using a pair of identical apparatus having the recording/playback functions as shown in FIG. 5 has been explained in the foregoing. In addition, when there is employed a double deck type machine in which two mutually independent tape transport mechanisms, two groups of heads, and two rotary drums one of which is used exclusively for recording and the other is used exclusively for playback are arranged in one apparatus together with a necessary circuitry as in a second embodiment shown in FIG. 11, the parts designated by the same reference numerals as those in FIG. 5 are the same construction, respectively. The arrangement of this embodiment differs from the apparatus of FIG. 5 in that a group of heads 23a to 23d exclusively used for recording and another group of heads 24a to 24d exclusively used for playback are provided, respectively, and that the changeover switches 7a to 7d are omitted. The dubbing timings in the case of the apparatus constructed as shown in FIG. 11 are shown in FIG. 12. As seen in this figure, the required RAM has a memory capacity corresponding to four frames, which is reduced by the memory capacity of two frames, as compared to the case shown in FIG. 10.

While the dubbing at the quadruple tape speed has been described up to now, a dubbing at the double speed may be conducted using the apparatus of FIG. 5. In this case, as shown in FIG. 4, the running velocity of the tape 3 is represented by vector $\overline{DE}$, the a magnitude of which is two times as much as that of the standard running velocity $\overline{CE}$ and is one half of that of the running velocity $\overline{AB}$ of the quadruple speed, wherein the direction of the velocity vector $\overline{DE}$ is the same as those of velocity vectors $\overline{CE}$ and $\overline{AB}$. Accordingly, in that case, the tangential velocities of the heads 6a to 6d are represented by vector $\overline{OD}$ and the drum rotational speed becomes equal to 2000 r.p.m. This rotational speed is equal to one in the standard mode of the conventional apparatus.

Figure 13:
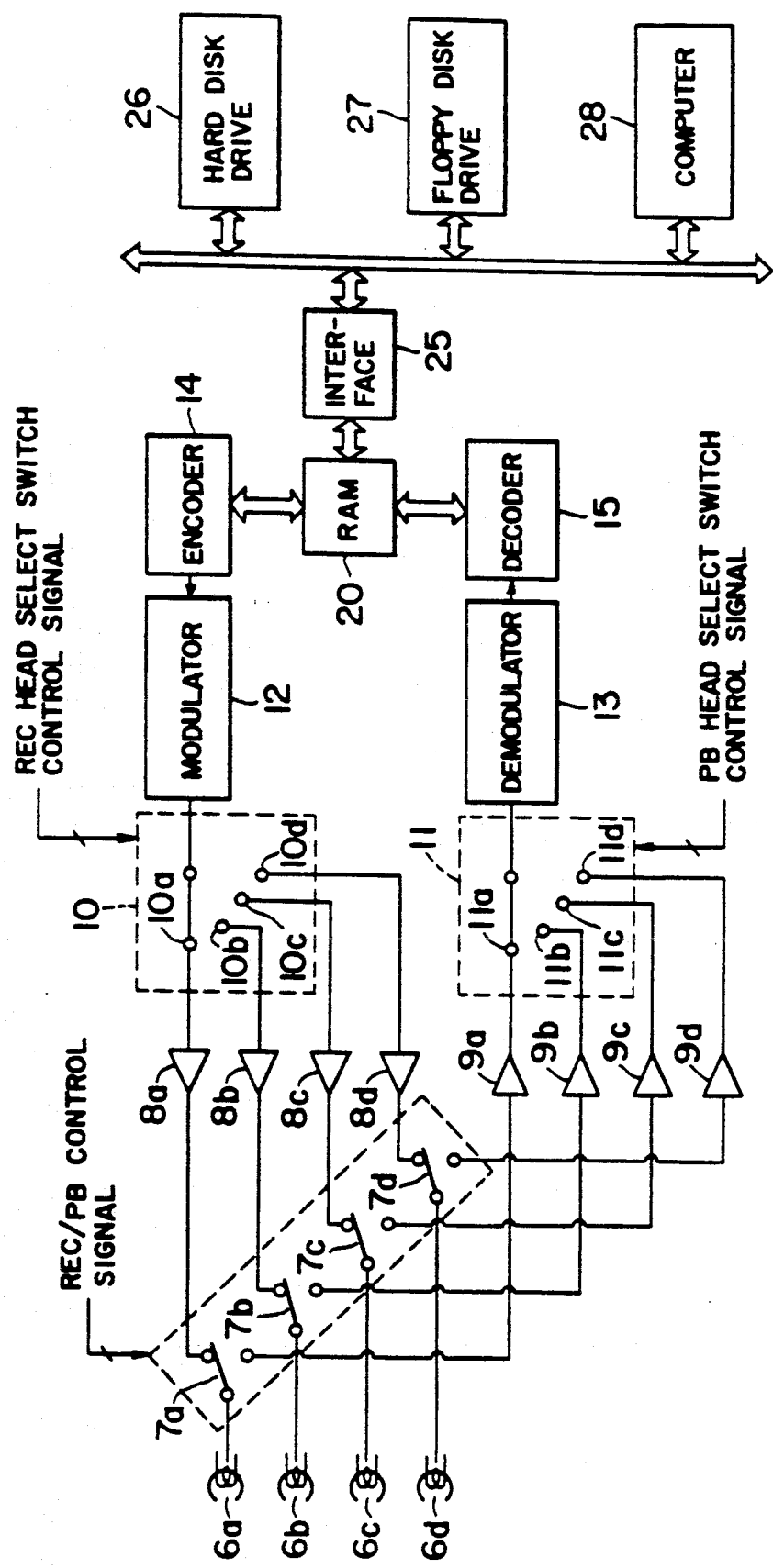
FIG. 13 is a block diagram showing the configuration in the case where the DAT of the first embodiment is used as a data streamer.

FIG. 13 is a block diagram showing a third embodiment in which DAT is actually used as a data streamer wherein the same components as those in FIG. 5 are designated by the same reference numerals, respectively, and their explanation will be omitted. In this figure, a hard disk drive (HDD) 26, a floppy disk drive (FDD) 27, and a DAT are connected to a computer 28 through an interface circuit 25. This arrangement is used for recording data stored in the HDD 26 and the FDD 27 onto a backup tape by means of the DAT. Because recording/playback at the double or the quadruple tape speeds can be conducted in this case, it is possible to transmit and receive data to and from the computer 28, etc. at a speed higher than that in the prior art.

FIG. 14 shows a rotary drum 29 and its peripheral arrangement according to a fourth embodiment of this invention. The diameter of the rotary drum 29 in the fourth embodiment is selected to 15.039 mm, which is substantially one half of 30 mm for the rotary drum 2 of the conventional apparatus shown in FIG. 1A, or 30.077 mm for the rotary drum 5 of the apparatus according to the first embodiment of this invention shown in FIG. 3. On the rotary drum 29, two magnetic heads 30a and 30b having different azimuth angles each other are provided at an angular interval of 180 degrees.

Different from the manners shown in FIGS. 1 and 3, the tape 3 is wound onto the rotary drum 29 in an angular range of 180 degrees, and the lead angle in this case is set to 6°21'0.82" in the same manner as in the case shown in FIG. 3.

The recording and playback apparatus of the fourth embodiment is directed in its development to build a system which satisfactorily performs a dubbing at the double tape speed. Similarly to FIGS. 4A and 4B, the running velocity of the tape 3, the tangential velocity of the magnetic head 30a or 30b, and the relative velocity between the magnetic heads 30a and 30b and the tape 3 are shown as respective vector diagrams in FIGS. 15A and 15B. In FIG. 15A, vector $\overline{OC}$ represents a tangential velocity (2000 r.p.m. when the diameter of the rotary drum is 30 mm) of the magnetic head 30a or 30b in the standard mode of the conventional apparatus, and vector $\overline{CE}$ represents a running velocity (0.815 cm/sec) in the standard mode of the tape 3. Accordingly, a lead angle defined by the vectors $\overline{OC}$ and $\overline{OP}$ is equal to 6°22'.

FIG. 15B is a table collectively showing vectors in FIG. 15A corresponding to the tangential velocity of the magnetic head, the running velocity of the tape 3, and the relative velocity therebetween in the double speed mode and in the standard mode.

When an operation is conducted to rotate the rotary drum 29 at 4000 r.p.m. in the apparatus of FIG. 14, the tangential velocity of the magnetic head 30a or 30b at that time is represented by vector $\overline{OD}$. At this time, when the tangential velocity of the tape 3 is assumed as vector $\overline{DE}$ two times larger than the vector $\overline{CE}$, the relative velocity between the tape 3 and the magnetic head 30a or 30b is expressed as vector $\overline{OE}$, which is in correspondence with the case in the standard mode of the conventional apparatus. Accordingly, in this case, the circuit characteristics of the magnetic heads 30a and 30b and the rotary transformer (not shown) in the rotary drum 29, etc. may be maintained same as ones for the conventional apparatus and the standard track angle θ which is equal to an angle ∠EOP and the standard track length L are observed.

In the case of carrying out recording/playback operation in the standard mode using the apparatus shown in FIG. 14, the rotary drum 29 revolves at 2000 r.p.m. At this time, the tangential velocity of the magnetic head 30a or 30b is represented by vector $\overline{OF}$ of FIG. 15A and the relative velocity with respect to the tape 3 running at a velocity expressed as vector $\overrightarrow{FG}$ is represented by vector $\overrightarrow{OG}$. This relative velocity is equal to one half of the relative velocity between the magnetic head and the tape 3 in the standard mode of the conventional apparatus and the standard track angle $\theta$ which is equal to the angle $\angle GOP$ and the standard track length L are observed.

Figure 16:
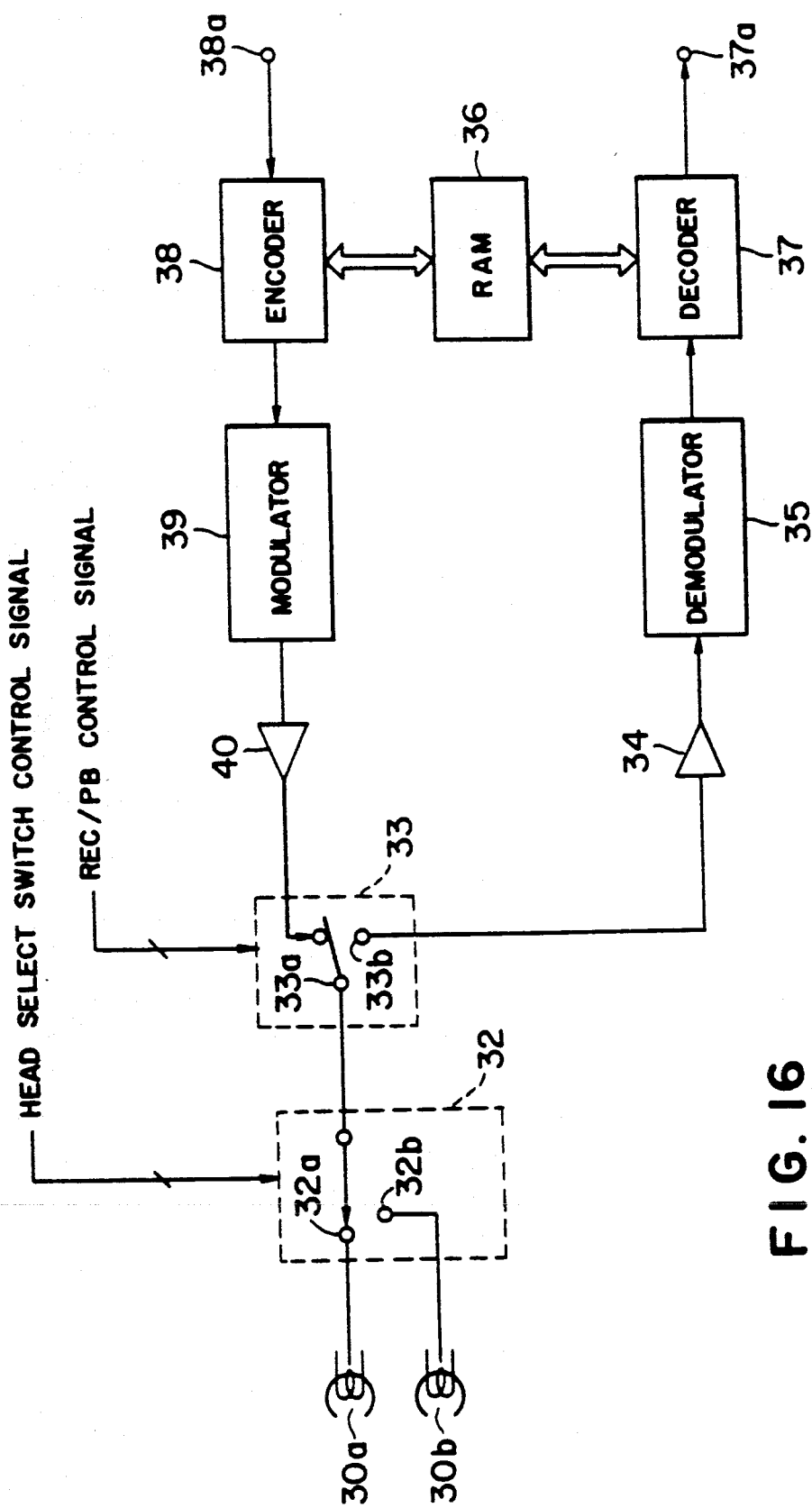
FIG. 16 is a block diagram showing a circuit configuration of DAT using the rotary drum according to the second embodiment shown in FIG. 14.
Figure 17:
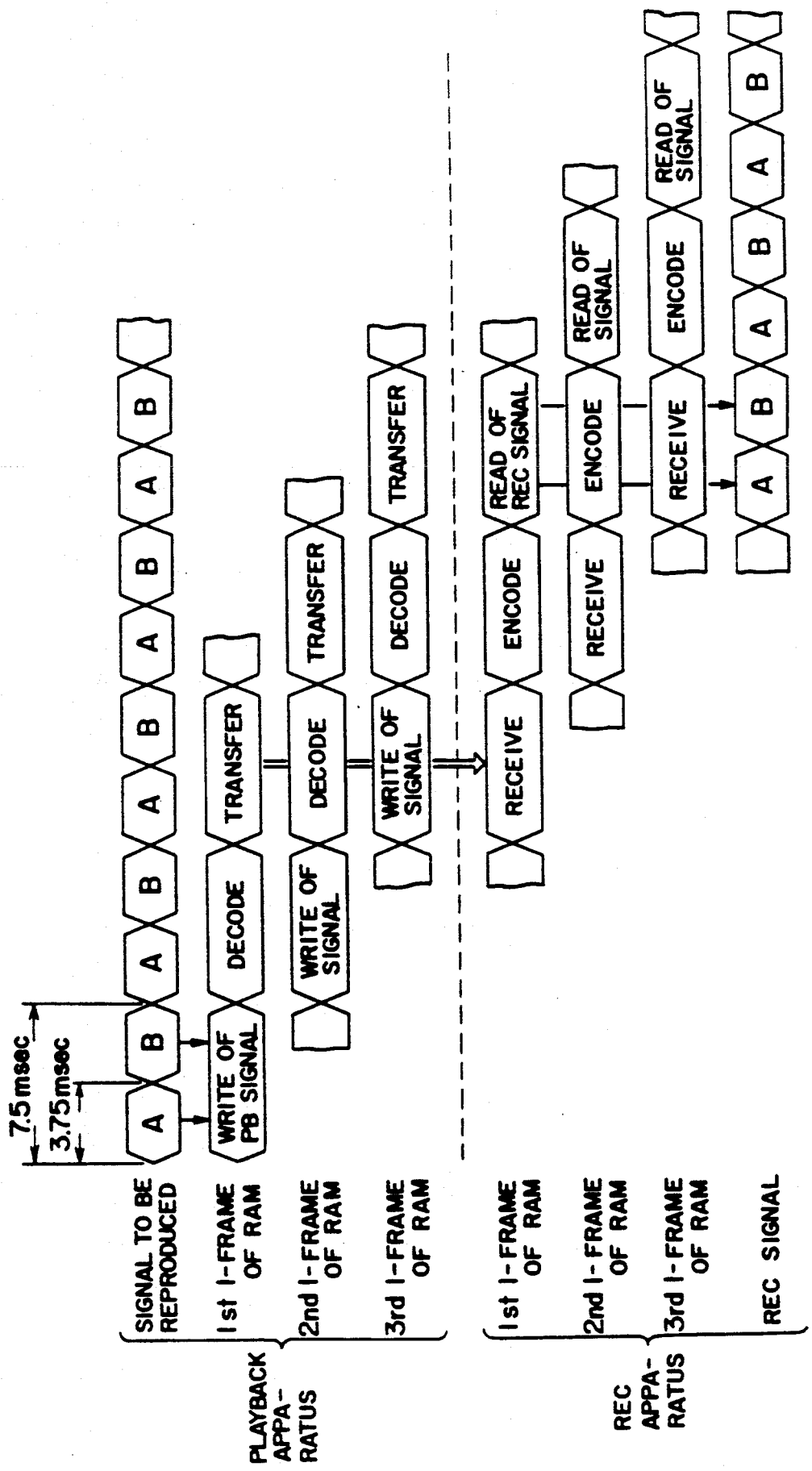
FIG. 17 is a timing chart showing the operation of the DAT of FIG. 14.

FIG. 16 is a block diagram of the recording and playback apparatus using rotary drum 29, etc. shown in FIG. 14. In this figure, the same components as those in FIG. 11 are designated by the same reference numerals, respectively, and their explanation will be omitted. In accordance with the DAT format, as described before, each frame is comprised of a set of A and B channels. Accordingly, in the playback (PB) section, as shown in the timings of FIG. 17, respective operations of playback, decoding and transfer are carried out frame by frame and three frames by such complete one playback cycle. Thus, RAM having a memory capacity corresponding to three frames is required.

The double speed dubbing of a digital signal, e.g., an audio signal, etc. using a pair of two identical recording and playback apparatus according to the fourth embodiment will be now described.

In reproducing a digital signal by means of magnetic heads 30a and 30b, a time period corresponding to one revolution of the rotary drum 29 is assumed as one cycle. At this time, a changeover switch 33 is connected to a playback side contact 33b. In the case of playback for the A channel by means of the magnetic head 30a, a changeover switch 32 is connected to a fixed contact 32a. On the other hand, in the case of playback for the B channel by means of the magnetic head 30b, the changeover switch 32 is connected to a fixed contact 32b. Since it takes 7.5 msec to reproduce one channel, the changeover switch 32 is switched to the contact 32a or 32b every 7.5 msec by the head select switch control signal.

The reproduced signal is amplified by the playback amplifier 34, and is then demodulated by a demodulator circuit 35. The signal thus demodulated is written into a RAM 36. Next, the signal data transferred from the RAM 36 is subjected to decoding and error correction performed by the decoder 37, and is then transferred through a terminal 37a as digital data to the other apparatus of the pair, which performs as a recorder.

In the recorder, the changeover switch 33 is connected to a recording side contact 33a. The digital data having been transferred is through a terminal 38a first written into the RAM 36 of the recorder. A modulated digital data stored in the RAM 36 is encoded by an encoder 38, and is then modulated by a modulator 39. The digital signal of the A channel thus formed is written onto the tape 3 by means of the magnetic head 30a being amplified by the recording amplifier 40. On the other hand, a modulated digital signal of the B channel is written onto the tape 3 by means of the magnetic head 30b being amplified by the recording amplifier 40. Also in this case, recording is conducted while the changeover switch 32 is being switched by the head select switch control signal every 7.5 msec.

In this fourth embodiment, even in the case of carrying out a dubbing at the double speed, the relative velocity between the magnetic head 30a or 30b and the tape 3 is the same as that in the standard mode, and the diameter of the rotary drum 29 is reduced to about one half of that of the conventional apparatus, resulting in the advantage that the entirety of the apparatus including mounting components for the drum can be small-sized and lightweight.

The recording and playback apparatus of this embodiment constructed as stated has following advantages. Even in the case of carrying out recording/playback at the quadruple tape speed, by arranging such that the diameter of the rotary drum is equal to, e.g., 30.077 mm and the lead angle is equal to, e.g., 6°21'0.82", there may be adopted a rotational speed of the rotary drum equal to 4000 r.p.m. which is twice as much as that of the prior art. Accordingly, a stable operation of the running system is assured. The aforementioned double rotational speed of the drum may be realized only by allowing the rotary transformer and/or the magnetic head to have a frequency characteristic extended twice as wide as the conventional one, and by allowing the operating speeds for the demodulation of a reproduced signal and writing into the RAM in the playback system, and reading from the RAM and the modulation in the recording system to be twice as high as the conventional ones. Thus, even in the case of using DAT as a data streamer, data can be transferred from the computer, etc. at a higher speed than normal. Moreover, in the case of carrying out recording/playback at the double tape speed using the rotary drum constructed above, it is sufficient that the rotational speed of the rotary drum be equal to 2000 r.p.m. At this time, the relative velocity between the magnetic tape and the magnetic head becomes the standard relative velocity. Because the frequency characteristics and the operating speeds are the same as those in the conventional apparatus, conventional components may be used for the rotary transformer, the magnetic heads, the modulator/demodulator circuits and the like.

Further advantages with this embodiment are as follows. By employing an arrangement in which the diameter of the rotary drum is selected to, e.g., 15.039 m, the lead angle is selected to, e.g., 6°21'0.82", and the magnetic tape is wound in an angular range of 180 degrees, when recording/playback at the double tape speed is conducted, the rotary drum's rotational speed becomes equal to 4000 r.p.m. and the relative velocity between the magnetic tape and the magnetic head becomes the standard relative velocity. Accordingly, the frequency characteristics of the magnetic head and the rotary transformer, the modulation/demodulation operating speeds, the operating speeds for writing/reading into and from the RAM, and the like may be maintained same as those in the conventional apparatus, and the diameter of the rotary drum may be about one half of the one for the conventional apparatus, resulting in the advantage that the apparatus can be compact and lightweight.

We claim:

1. In a digital signal recording and playback apparatus having a rotary drum, magnetic heads on said drum for recording onto a magnetic tape wound around an outer periphery of said drum at a lead angle and/or reproducing a digital signal, said magnetic tape being transported at a running speed so that said digital signal is recorded along an oblique track as a head scanning locus on the magnetic tape conforming to a standard track angle and a standard track length defined in an Industry Standard established for existing digital signal recording and playback apparatuses designed for the magnetic tape, the improvement wherein:

four of said magnetic heads are mounted on an outer periphery of said rotary drum at equiangular distances of substantially 90 degrees;

said magnetic tape is wound around said rotary drum through an angular range of substantially 90 degrees;

said rotary drum has a diameter of 30.077 millimeters;

said rotary drum according to said Industry Standard has a standard diameter of 30 mm;

said lead angle is 6°21'0.82"; and said lead angle according to said Industry Standard is 6°22';

so that when said running speed of said magnetic tape has a value N times a standard running speed of said Industry Standard where (N>1), and the rotational speed of said rotary drum is $(\frac{1}{2}) \times N$ times a standard rotational speed of said rotary drum, said diameter of said rotary drum is larger than said standard diameter of said rotary drum, and said lead angle is smaller than said standard lead angle, relative speed between said magnetic heads and said magnetic tape becomes equal to a value $(\frac{1}{2}) \times N$ times that of said existing digital signal recording and playback apparatus and recording of a digital signal onto said magnetic tape is performed on said oblique track formed in conformity with said standard track angle and said standard track length.

2. A digital signal recording and playback apparatus as claimed in claim 1, wherein:

said rotary drum comprises part of a digital audio tape recorder (DAT) for recording/playback of a digital audio signal on magnetic tape which is transported at the standard running speed, at double running speed which is twice the standard running speed, and at quadruple running speed which is four (4) times the standard running speed.

3. A digital signal recording and playback apparatus which uses a magnetic tape transported at a running speed and conforming to a standard track angle and standard track length defined in an Industry Standard established for existing digital signal recording and playback apparatuses designed for the magnetic tape, comprising:

a rotary drum having an outer periphery and a rotational speed of $(\frac{1}{2}) \times N$ times a Standard rotational speed and a diameter larger than a standard diameter of said Industry Standard;

a magnetic tape having a running speed having a value N times a standard running speed according to said Industry Standard where N>1;

a plurality of magnetic heads on said outer periphery of said drum for recording a digital signal onto a magnetic tape wound around part of an outer periphery of said drum at a lead angle, and/or reproducing a digital signal from said magnetic tape, said lead angle being smaller than a standard lead angle according to said Industry Standard, relative speed between said heads and tape being equal to a value $(\frac{1}{2}) \times N$ times that of existing digital signal recording and playback apparatuses and recording of a digital signal onto said magnetic tape being performed on an oblique track formed in conformity with said standard track angle and said standard track length;

a recording circuit for reproducing said digital signal from said track on said tape and comprising an encoder for encoding a digital signal supplied thereto into a predetermined format and for storing in a memory an encoded digital signal thereby, a modulator for modulating a digital signal read out from said memory and for alternately outputting as a modulated digital signal a first channel signal to be recorded on a first track and a second channel signal to be recorded on a second track which is formed subsequently to a formation of the first track on said magnetic tape, said first channel signal and said second channel signal subsequently outputted from the modulator constituting a frame, means for generating control signals and including a first terminal for receiving a frame signal having high and low levels alternately changing at a rate of said frame, and a second terminal for receiving a channel discrimination signal having high and low levels alternated so as to correspond with a change of said first and second tracks, a first NOT circuit for inverting said frame signal, a second NOT circuit for inverting said channel discrimination signal, a first NAND circuit for inputting said frame and channel discrimination signals to provide an inverted logical product thereof as one of said control signals, a second NAND circuit for inputting said frame signal and an output from said second NOT circuit to provide an inverted logical product thereof, a third NAND circuit for providing an inverted logical product of an output from said first NOT circuit and said channel discrimination signal, and a fourth NAND circuit for providing an inverted logical product of respective outputs from said first and second NOT circuits;

a recording head select switch for sequentially switching a plurality of said magnetic heads in response to said control signals supplied thereto, and recording amplifier means connected to said recording head select switch so that said digital signal read out from said memory is amplified and sequentially fed to said plurality of said magnetic heads through a changeover switch in a recording mode whereby said digital signal is recorded on tracks formed sequentially by said plurality of said magnetic heads; and a playback circuit comprising a playback amplifier means for amplifying reproduced signals read by said magnetic heads and delivered thereto through said changeover switch in a playback mode, amplifier means for converting signals successively read out by said magnetic heads into a continuous stream of digital signals responsive to said control signals supplied thereto, a demodulator for demodulating said continuous stream of digital signals from the reproducing head select switch and for storing in a memory a demodulated signal thereby, and a decoder for decoding a digital signal read out from the memory for outputting thereof;

said changeover switch comprising a switch for effecting switching operation for selectively connecting said magnetic heads to either said recording circuit or playback circuit; and said memory comprising memory means for storing digital signals recorded by said recording circuit and reproduced by said playback circuit.

4. In a digital signal recording and playback apparatus having a rotary drum with an outer periphery and provided with a plurality of magnetic heads for recording and/or reproducing a digital signal onto and/or from a magnetic tape wound around part of an outer periphery of said rotary drum at a lead angle, said magnetic tape being transported at a running speed so that said digital signal is recorded along an oblique track as a head scanning locus on the magnetic tape conforming to a standard track angle and a standard track length defined in an Industry Standard established for existing digital signal recording and playback apparatuses designed for the magnetic tape, the improvement wherein:

said rotary drum has a diameter of 15.039 mm when the standard diameter is 30 mm according to said Industry Standard; and said lead angle is 6°21′0.82″ when said standard lead angle is 6°22′ according to said Industry Standard;

so that when said running speed of said magnetic tape is selected to a value N times the standard running speed of Industry Standard, where $N \geq 1$, and the rotational speed of said rotary drum is N times the standard rotational speed of said Industry Standard, said diameter of said rotary drum is smaller than said standard diameter and said lead angle is smaller than said standard lead angle whereby said magnetic heads and said magnetic tape have a relative speed with respect to each other equal to the relative speed of said existing digital signal recording and playback apparatuses, and recording of said digital signal onto said magnetic tape is performed on said oblique track formed in conformity with said standard track angle and said standard track length.

5. A recording and playback apparatus as claimed in claim 4, wherein:

said value N is in the range from 1 to 2; and said magnetic heads comprise two magnetic heads mounted on said outer periphery of said rotary drum at an angular distance of 180 degrees and said magnetic tape is wound around said outer periphery through an angular range of 180 degrees;

so that said recording and playback become operable with said running speed of the magnetic tape at a standard speed and a double speed which is two times said standard speed so that relative speed between said magnetic heads and said magnetic tape does not exceed that of said existing digital signal recording and playback apparatus.

* * * * *